March 1, 1927.  
J. N. SCHWARZ ET AL  
1,619,489  
TILE MAKING MACHINE  
Original Filed Nov. 29, 1922  6 Sheets-Sheet 1

INVENTORS  
John N. Schwarz  
BY Vincent W. Schwarz  
Wooster & Davis  
ATTORNEYS March 1, 1927.

J. N. SCHWARZ ET AL 1,619,489

TILE MAKING MACHINE

Original Filed Nov. 29, 1922    6 Sheets-Sheet 2

INVENTORS
John N. Schwarz
Vincent W. Schwarz
BY
Wooster & Davis
ATTORNEYS

March 1, 1927.  J. N. SCHWARZ ET AL  1,619,489

TILE MAKING MACHINE

Original Filed Nov. 29, 1922  6 Sheets-Sheet 4

INVENTORS
John N. Schwarz
Vincent W. Schwarz
BY Wooster & Davis
ATTORNEYS

March 1, 1927.

J. N. SCHWARZ ET AL 1,619,489

TILE MAKING MACHINE

Original Filed Nov. 29, 1922   6 Sheets-Sheet 5

INVENTORS
John N. Schwarz
and Vincent N. Schwarz
BY
Hooster & Davis
ATTORNEYS

INVENTORS
John N. Schwarz
and Vincent W. Schwarz
BY Wooster & Davis
ATTORNEYS

Patented Mar. 1, 1927.

1,619,489

UNITED STATES PATENT OFFICE.

JOHN N. SCHWARZ, OF BRIDGEPORT, AND VINCENT W. SCHWARZ, OF FAIRFIELD, CONNECTICUT.

TILE-MAKING MACHINE.

Application filed November 29, 1922, Serial No. 603,991. Renewed December 16, 1926.

This invention relates to a machine and method of forming tile, especially concrete roofing tile, and has for an object to provide an improved mechanism which will automatically tamp and mold the concrete in the forms or molds and give the shape desired to the upper surface of the tile in a continuous operation.

It is a further object of the invention to provide an improved means for smoothing the upper surface of the tile, so that the finished tile will have a desired surface.

It is also an object of the invention to provide an improved means for adding coloring matter to the concrete.

It is a still further object of the invention to provide a mechanism which will form the tiles in a continuous strip, which after being formed will be cut to the desired lengths.
With the foregoing and other objects in view, we have devised the construction illustrated in the accompanying drawings, in which—

Figures 3, 4, 19, 20, 21, 22, 23, 24, 25:
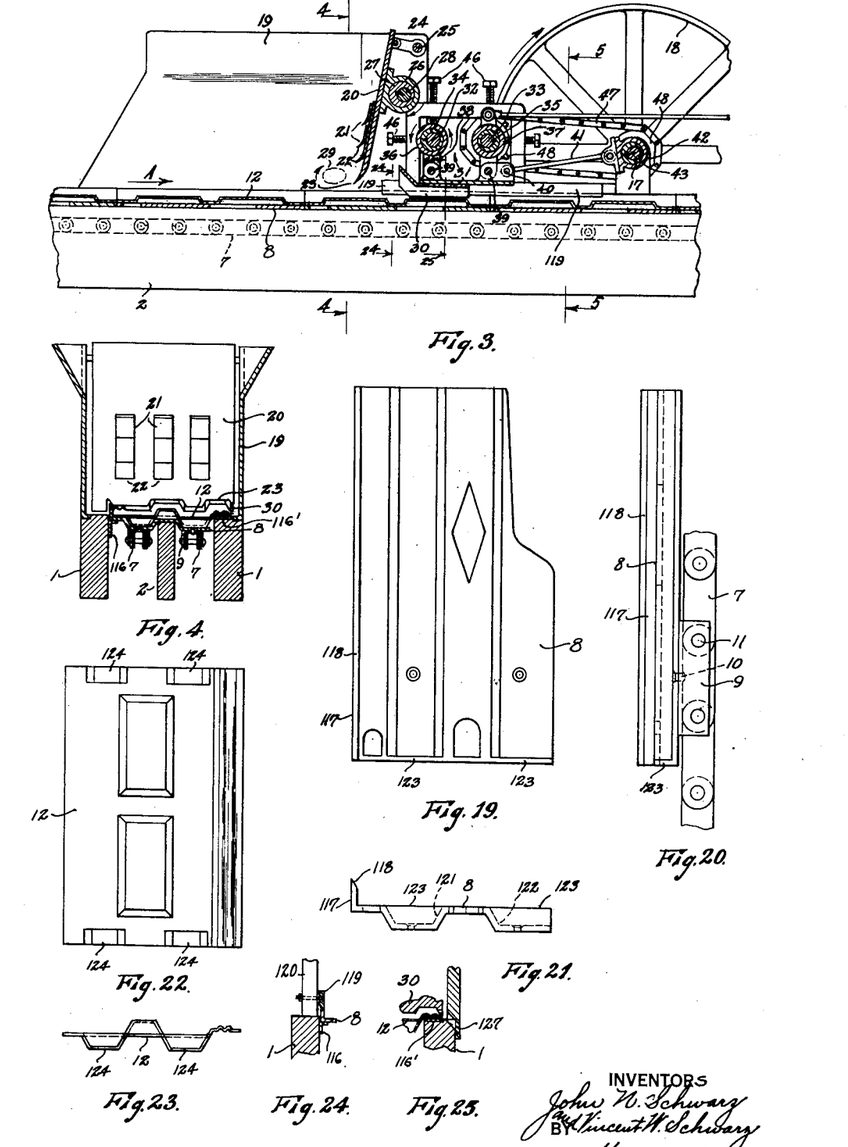
Fig. 3 is a central longitudinal section through the forward end of the machine.
Fig. 4 is a transverse section substantially upon line 4—4 of Fig. 3.
Fig. 19 is a top plan view of the holder for the molds.
Fig. 20 is a side elevation thereof, showing the means of securing the same to a chain conveyor.
Fig. 21 is an end view of the holder looking from the bottom of Fig. 19.
Fig. 22 is a top plan view of the mold used to form the tile shown in Figs. 17 and 18.
Fig. 23 is an end view thereof.
Fig. 24 is a detailed transverse section through the left hand side of the holder substantially on line 24—24 of Fig. 3.
Fig. 25 is a detailed transverse section at the right hand side of the tamper substantially in the plane of line 25—25, Fig. 3.
Figure 9:
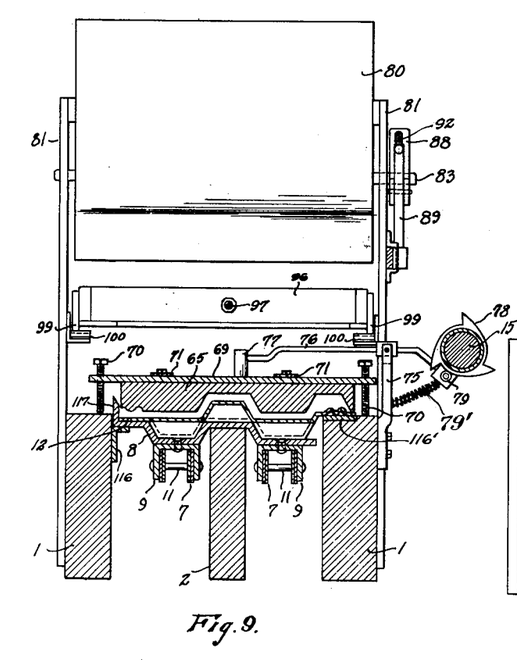
Fig. 9 is a transverse section substantially on line 9—9 of Fig. 8.

The machine comprises a supporting frame of any suitable construction, but we have shown two longitudinal side beams 1 and an intermediate beam 2 supported by suitable legs 3. At the opposite ends of the frame are transverse shafts 4 and 5 carrying suitable sprockets 6, between which runs a pair of endless chains 7 to which are secured the supporting elements 8 for the molds. These elements may be secured to the chain by any suitable means, but in Figs. 9 and 20 we have shown U-shaped elements 9 secured to the bottom of the supports 8 by suitable bolts 10 and embracing a link of the chain and secured thereto by passing the pivot pins 11 of a link through the arms of the element. These supports are so spaced on the chain that the molds 12 carried thereby will be placed end to end as shown in Fig. 3, and as the sprockets are rotated the upper run of the chain and the molds are moved in the direction of arrow A shown in Fig. 3. The rear shaft 5 carrying the rear sprocket is rotated by means of a worm gear 13 meshing with a worm 14 on a longitudinally extending shaft 15 driven by means of beveled gears 16 from a transverse shaft 17 rotated by the drive pulley 18, which pulley is driven from any suitable source of power as an electric motor, not shown.

As the chain with the supports 8 advances along the top of the frame the molds 12 are placed on top of the supports at the forward end of the machine. As they pass through the machine they are filled with the concrete, which is tamped to form, colored and troweled as it passes through the machine, and then the molds are removed from the machine at the rear end thereof and placed aside to allow the concrete to set. This mechanism for tamping, forming and finishing the surface of the concrete will now be described.

Adjacent the forward end of the machine above the molds is an open bottom hopper 19 provided adjacent its rear end with an upright gate 20, the lower edge of which is given a contour approximately that desired to be given the top surface of the tiles, and on the front wall of this gate are secured stirring and pushing fingers 21. These fingers are preferably pieces of sheet metal, having downwardly extending sharp edges 22 spaced somewhat forwardly of the gate, and the lower edge 23 of the gate is also preferably relatively thin and curved forwardly as shown in Fig. 3. The gate is so mounted that its lower edge will have up and down and also reciprocating movement longitudinally of the molds as these molds pass under the same. Adjacent the opposite ends of this gate and also adjacent the upper edge are pivoted two links 24 mounted on a cross shaft 25, and secured to the rear face of the gate is a bearing 26 embracing an eccentric 27 on a transverse shaft 28. As this shaft is rotated in the direction of the arrow shown in Fig. 3 the combined action of the eccentric and the links 24 imparts to the lower edge of the gate movement in an elliptical path substantially as indicated at 29 in Fig. 3, and it will be noted that this lower edge moves forwardly in the opposite direction to the movement of the molds when it is in its lowermost position, so that when the concrete of which the tile is formed is placed in the hopper the action of the gate thereon is to tend to force it forwardly and upwardly so that it will not crowd under the gate in a greater amount than desired. The gate will impart a corresponding movement to the fingers 21 which will stir the concrete in the hopper and tend to push the same downwardly towards the space between the lower edge of the gate and the molds.

Figures 12, 13, 14, 15, 16, 17, 18:
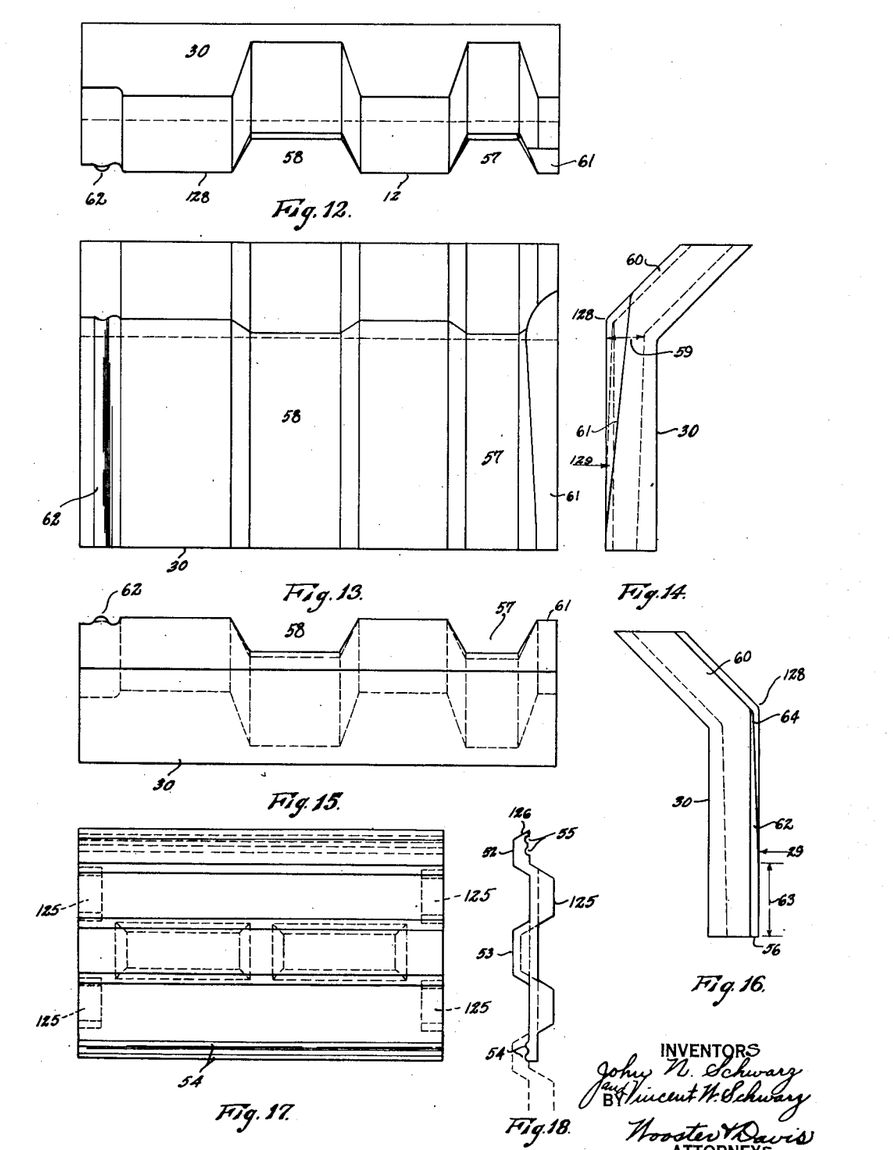
Fig. 12 is a front end view of the tamper used to give a shape of tile shown in Figs. 17 and 18.
Fig. 13 is a bottom plan view thereof.
Fig. 14 is a side elevation looking from the right of Fig. 13.
Fig. 15 is an end view looking from the bottom of Fig. 13.
Fig. 16 is a side elevation looking from the left of Fig. 13.
Fig. 17 is a top plan view of the form of tile made by this machine with the set of tools illustrated.
Fig. 18 is an end view thereof.
Figure 26:
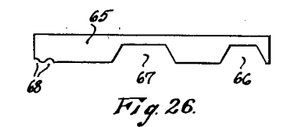
Fig. 26 is an end view of a trowel used in forming the tile shown in Figs. 17 and 18.
Figure 27:
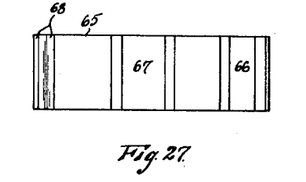
Fig. 27 is a bottom plan view thereof.
Figure 28:
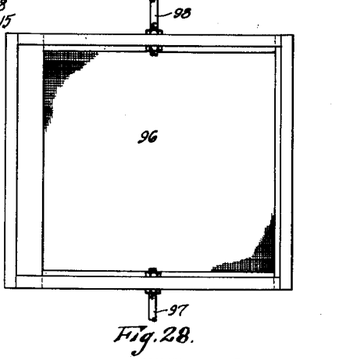
Fig. 28 is a top plan view of the screen used for the coloring matter.

Immediately to the rear of the gate is the tamper 30 which forms the upper surface of the tile, and to give the form of tile illustrated in Figs. 17 and 18 we use a tamper formed substantially as shown in Figs. 12 to 16 inclusive. We wish it to be distinctly understood, however, that this machine is not limited to making a tile shaped as shown in Figs. 17 and 18. There are numerous other forms of tiles which may be made by this machine and for which a suitably formed tamper will be used. The form of tile shown is, however, one of the hardest to make properly and to make uniformly so that each one will be the same as every other one. As this machine will satisfactorily and accurately form this type of tile, obviously it will be equally satisfactory in making the more simpler forms of tile.

Figure 5:
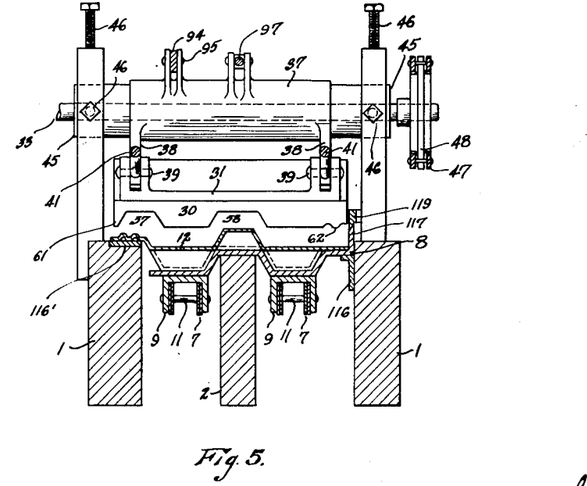
Fig. 5 is a transverse section substantially on line 5—5 of Fig. 3, but on an enlarged scale.

In the construction shown the tamper is secured to a support 31 on the under side thereof above the molds. Above the support are mounted two transverse shafts 32 and 33 which rotate in opposite directions as indicated by the arrows in Fig. 3. Mounted on these shafts so as to rotate therewith are suitable eccentrics 34 and 35, and embracing these eccentrics are suitable housings 36 and 37, each of which has downwardly extending arms 38 which have pivotal connections with the tamper support 31 as shown at 39, in Figs. 3 and 5. These eccentrics are so arranged that they are both simultaneously in their lowermost position and pivoted to the rear of the support 31, as shown at 40, are connecting rods 41 leading to an eccentric strap 42 embracing an eccentric 43 on shaft 17, and this eccentric is so arranged and designed as to move the tamper rearwardly in a direction of movement of the molds and at approximately the same speed as these molds when the tamper is in its lowermost position so that in this position there is practically no relative horizontal movement of the tamper relative to the cement, and the surface of the cement will not be broken. The shafts 32 and 33 are mounted in adjustable bearings 44 and 45 respectively. These bearings may be adjusted by any suitable means as by adjusting screws 46 and by adjusting these screws the height of the tamper above the molds may be varied, to regulate the thickness of the tile. These bearings may also be adjusted to regulate the angle of inclination of the tamper with respect to the mold. The shaft 33 is driven from the shaft 17 as by a suitable chain 47 running over suitable sprockets 48 and shaft 32 is driven from shaft 33 by suitable spur gears 49 shown in Figs. 1 and 2. The shaft 28 is driven from shaft 32 by suitable gears 50 and 51 shown in Figs. 1 and 2.

The specific construction of the tamper for forming the type of tile shown in Figs. 17 and 18 is illustrated in detail in Figs. 12 to 16 inclusive. This tile, as shown in Figs. 17 and 18, has two spaced longitudinal upwardly extending ridges 52 and 53 with tapering sides, as shown, the ridge 52 being at one edge of the tile. Along the opposite edge of the tile are two longitudinal ribs 54 which are adapted to interlock with corresponding grooves 55 on an adjacent tile under the ridge 52 when the tiles are placed in position on the roof, as indicated in dotted lines in the lower part of Fig. 18, the ridges 52 and 53 and ribs 54 extending throughout the entire length of the tile. It will be apparent that the lower surface of the rear end 56 of the tamper will correspond to the contour of the upper surface of the tile, but reversed as shown in Fig. 15. However, forwardly of this end the surfaces are given certain tapers or inclines to produce a proper forming of the ridges and ribs and smoothing of the surfaces of the concrete without breaking the same. We have found that the grooves 57 and 58 for forming the ridges 52 and 53 respectively should be somewhat deeper at the forward ends thereof, as shown at 59 in Fig. 14, than they are at the rear end of the tamper, and the forward end 60 is inclined upwardly at a suitable angle. We have found an angle at about 50° to work very satisfactory. On the side of the tamper which forms the ridge 52 the rib 61 should be tapered approximately as shown in Figs. 12, 13 and 14 and the rib 62 for forming the groove between the ribs 54 should preferably be substantially as indicated in Fig. 16, that is, as being of a uniform height for a distance indicated at 63, Fig. 16 adjacent the rear end of the tamper and then gradually growing of less height toward the front of the tamper, as shown at 64. It has been found that these tapers facilitate the proper forming of the upper surface of the tile, and give a very uniform and smooth surface.

After the molds filled with cement leave the tamper the upper surface is smooth and compressed by a special trowel and operation of the same, which we have found to be very important in the proper formation of the tile in giving a uniform product and a uniformly smooth surface, and we believe we are the first to employ this device and to secure this result. In the preferred embodiment, as shown in Figs. 8, 9, 26 and 27, we mount above the molds a trowel 65 having its lower surface formed with longitudinal grooves 66, 67 and 68 corresponding to the ridges 52 and 53 and ribs 54 respectively on the upper surface of the tile. In other words the lower surface of the trowel is given a contour corresponding to that of the upper surface of the tile. This trowel may be of various lengths in the direction of movement of the tile but we have found about 3 inches to be very satisfactory. It is supported above the molds by means of a support 69 to which the trowel is secured and is held at a suitable height above the molds by adjusting screws 70 resting at their lower ends on the tops of the frame 1. By adjusting these screws the height of the trowel may be regulated as will be obvious. Leading forwardly from the support 69 are bars 71 connected to upright bolts 72 secured to the beams 1. Below these bars on bolts 72 are coiled springs 73, and threaded on the bolts above the bars are thumb nuts 74. By adjusting these nuts the inclination of the trowel to the horizontal, and thus the upper surface of the concrete, may be regulated as desired, and we have found that an inclination of about 10°, with the forward end of the trowel higher, is correct. Pivoted at one side of the trowel, as on a suitable supporting bracket 75, is a hammer 76 with its head 77 about the support 69, and this hammer is operated by a suitable cam 78 on the shaft 15, one arm of the hammer having a suitable roller 79 adapted to engage the cam surfaces and is held against these surfaces by a suitable spring 79'. As the cam rotates the weight of the hammer head 77 in conjunction with the spring 79' will impart suitable blows to the trowel which the cement tends to raise slightly as it passes under the same. This hammering pushes the trowel downwardly until the ends of the screws 70 limit this movement and at the same time it draws the water in the cement to the surface so that the surface and especially the ridges 52 and 53 will not become too dry. We have found this device to be very important as it prevents too rapid drying out of the surface and also facilitates the addition of the coloring matter and final smoothing or troweling of the surface and produces a more uniform and better tile. One of the difficulties encountered in making these tile prior to our invention was to keep sufficient moisture in the ridges 52 and 53, or in other words to keep them from drying out too rapidly producing a surface which could not later be properly smoothed by troweling and also not giving a good quality of tile.

Figure 6:
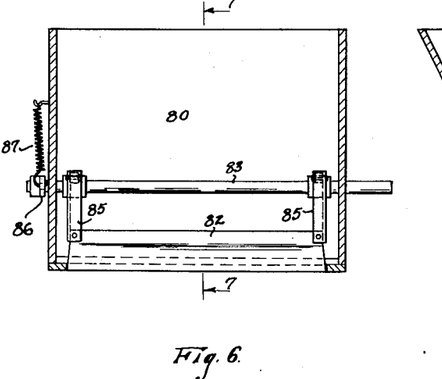
Fig. 6 is a longitudinal section through the feed hopper for coloring matter, substantially on line 6—6 of Fig. 7.
Figure 7:
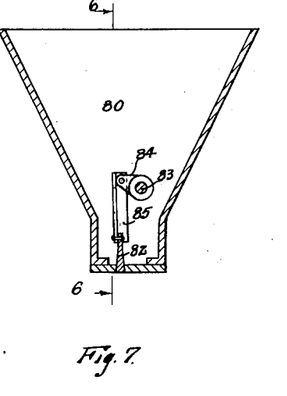
Fig. 7 is a transverse section thereof, substantially on line 7—7 of Fig. 6.
Figure 8:
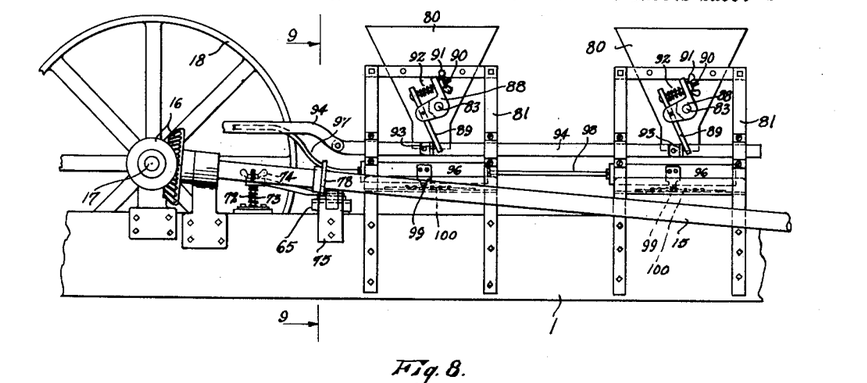
Fig. 8 is a side elevation of the central portion of the machine, showing the means of feeding the coloring matter to the concrete.

After the cement leaves this trowel the coloring matter is added thereto in the form of a fine powder. We preferably employ two hoppers 80 supported on the frame by suitable supports 81 above the run for the molds. These hoppers have a longitudinal slit in the bottoms thereof, as shown in Figs. 6 and 7, in which is placed a tapered gate 82, the larger side of this gate being substantially equal to the width of this slot. Extending transversely of the hopper is a shaft 83 having secured thereto suitable arms 84, and the gate 82 is suspended from these arms by suitable connections 85. At one end of the hopper outside the same the shaft carries another arm 86 to which is connected a spring 87 which tends to hold the gate raised into position to close the slot, as shown in Figs. 6 and 7. Mounted on the other end of the shaft 83 is a suitable operating mechanism comprising a bell crank 88 having a member 89 pivoted to one arm thereof. Connected to this member is a bolt 90 extending through the other arm of the bell crank and having threaded thereon a suitable thumb-nut 91. Between the element 89 and the bell crank is a spring 92 tending to separate these elements and the other end of the member 89 extends downwardly into the path of movement of certain lugs 93 carried by reciprocable rods 94. This rod is pivoted at its forward end to the upper part of the housing 37, as shown at 95, so that as this housing is rocked by the action of it eccentric the rod will be reciprocated. As this rod reciprocates the lugs 93 will engage the member 89 to rock the shaft 83 and move the gate 82 downwardly, thus opening the slots in the bottoms of the hoppers and allowing a certain amount of coloring matter therein to drop through. The amount of opening of the slot is regulated by adjusting the thumb-nuts 91 which will vary the amount of movement of the gates, as will be obvious. As the coloring matter leaves the hoppers it drops into fine mesh screens 96 located beneath the hoppers and above the cement. The forward screen is connected by rod 97 with the housing 37 and the two screens are connected together by a rod 98 so that they are constantly reciprocated. As these screens are reciprocated they are also given a jarring or up and down movement by means of suitable bearing lugs 99 at the opposite ends thereof moving back and forth on vertically corrugated shoes 100. The combination of the up and down and horizontal movements and the accurate regulation of the discharge of the coloring matter from the hoppers gives a very accurate and uniform distribution of this coloring matter to the cement as it passes under the screens.

Figure 1:
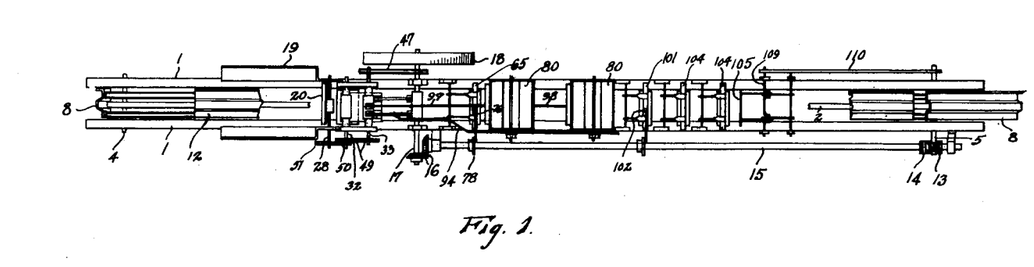
Fig. 1 is a top plan view of the complete machine.
Figure 2:
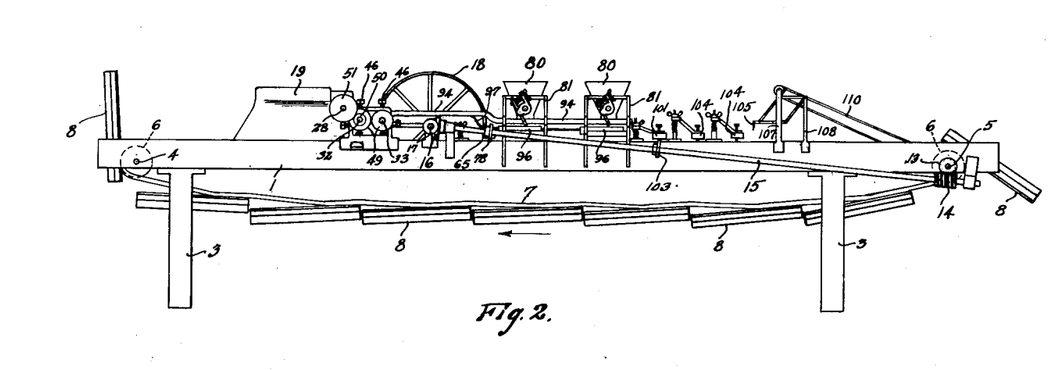
Fig. 2 is a side elevation of the same.
Figure 10:
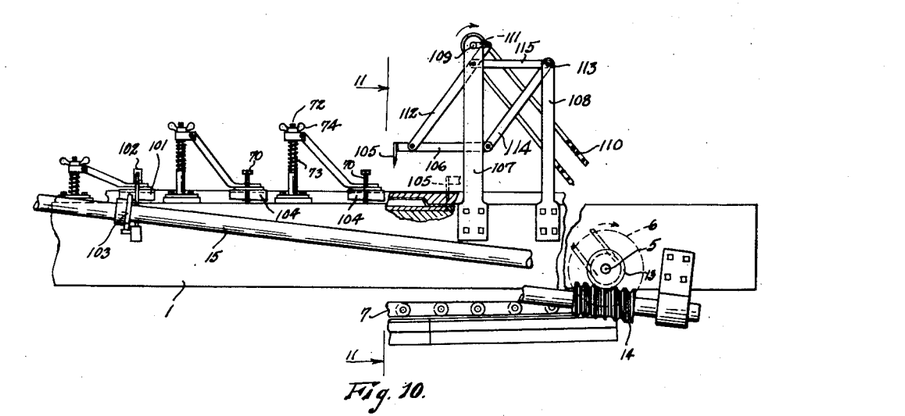
Fig. 10 is a side elevation of the rear end of the machine.
Figure 11:
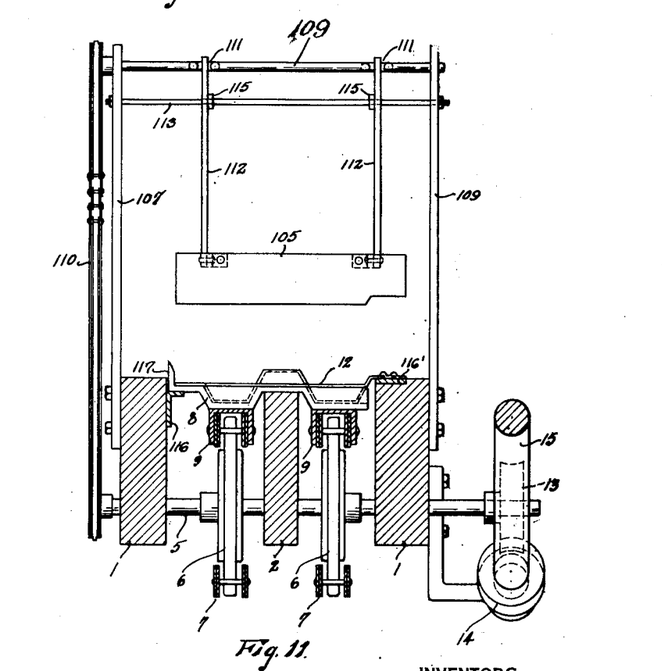
Fig. 11 is a transverse section substantially upon line 11—11 of Fig. 10.

After the molds carrying the cement pass from under the hoppers the upper surface of the cement is again acted upon by a trowel and hammer shown in Figs. 1, 2 and 10, the trowel being indicated at 101 and the hammer at 102. This trowel and hammer are of the same construction and are operated in the same way as the trowel 65 and hammer 76 forwardly of the hoppers, the operating cam for the hammer being shown at 103. This hammer trowel has the same effect as the trowel 65 drawing the moisture in the cement to the surface thereof, preventing it drying out and also suitably moistening the coloring matter. The cement then passes under one or more stationary trowels 104 shown in Figs. 1, 2 and 10. These trowels are the same construction and are mounted in the same way as are the hammer trowels 65 and 101, but no hammers are used with these trowels. We preferably employ two of these trowels and it is found that this number gives a very fine smooth surface to the top of the tile.

The molds in which the cement is tamped to form the tile may have a flange across one end thereof of the same height as the thickness of the tile, in which event as the molds pass to the rear end of the machine each carries an individual tile, and the molds may be taken off the conveyer at the rear end of the machine and set aside to allow this concrete to harden. It has been found that this flange will carry along more cement than will the central portion of the mold which sometimes causes a slight bulge in the body of the finished tile adjacent its end. We, therefore, prefer to omit this flange on the mold so that these tile are molded in one continuous slab of concrete, and then cut this slab transversely between adjacent molds to produce the individual tile. After the slab is cut the molds are removed from the conveyer at the rear end of the machine and set aside to allow the concrete to harden as in the first instance.

This mechanism for cutting a slab is indicated in Figs. 1, 2, 10 and 11. It may comprise different mechanism but we have shown it as comprising a knife or cutter 105 supported by a suitable frame 106. Secured to the side of the beams 1 are upright brackets 107 and 108. In the brackets 107 is a shaft 109 which may be rotated from the shaft 5 by any suitable drive as the sprocket and chain drive 110. The shaft 109 is provided with a pair of cranks 111 to which are pivoted connecting links 112 pivoted at their other ends to the frame 106. Having pivotal connection with a rod 113, carried by the bracket 108, and with the frame 106 are other connecting links 114, and between the rod 113 and links 112 are connecting links 115 pivoted to this rod, and extending substantially parallel with the frame 106. As the shaft 109 rotates in the direction indicated by the arrow the knife 105 is moved downwardly into the concrete substantially on the line between two adjacent molds, and while in the concrete is given a movement in the direction of movement of the concrete until it is withdrawn therefrom, and the lengths of the cranks and the links are so proportioned that the horizontal movement of this knife, while in the concrete, is at substantially the same rate as the movement of the concrete so as to give a good clean cutting action.

After the molds filled with concrete are removed from the rear end of the machine the supporting elements 8 are carried back under the machine by the lower run of the chain to the forward end of the machine in position to receive the empty molds. As the supporting elements 8 move forwardly along the top of the machine they are preferably supported on the top of the intermediate beam 2 and at one edge by a suitable support or guide 116 secured to one of the side beams 1. To form the edge of the tile on which the ribs 54 are located the supporting element 8 has a flange 117 inclined at its upper edge, as shown at 118, to coact with a guiding element 119, shown in Fig. 24, secured to suitable supports 120 on the side of the machine. This guide, as shown in Fig. 3, extends for some distance to the front and rear of the tamper and prevents jumping of the molds under the action of this tamper, and thus retains them in the proper plane so that the thickness of the cement in the molds is uniform after it leaves the tamper. Flange 117 besides forming one edge of the tile retains the concrete so that it will be packed down properly by the tamper. The other side of the supporting elements 8 is cut away, as shown to the right of Fig. 19 and is located inwardly of the other beam 1, as shown in Figs. 4, 5, 9 and 11. This supporting element 8 has a general outline in cross section shown in these figures, and at the forward end of the depressions or grooves 121 and 122 are provided with transverse flanges 123 which are engaged by the downwardly projecting lugs 124 on the bottoms of the molds 12. Thus the molds will be carried along positively with the supports 8 and the edge opposite to flange 117 rests and slides on a shoe 116' on top of the frame 1. The depressions or lugs 124 are hollow so as to form lugs 125 at the opposite ends of the tile on the under sides thereof. These lugs are for the purpose of engaging over the transverse securing strips on a roof to hold the tile in position as is well known.

It will be apparent from an inspection of Figs. 4, 5, 18 and 25 that the outer inclined edge 126 is formed by the outer rib 61 of the tamper and as this wall is inclined, the up and down movement of the tamper will force concrete down into the space between this rib and the mold, and if this is closed at the side we have found that too much concrete will be packed at this edge and will sometimes become broken, making an imperfect edge to the tile. We have found, however, that by providing a slot or opening in the side wall at this edge of the tamper, as indicated at 127 in Fig. 25, and extending throughout a portion of the length of the tamper, as from about the bend 128 of the tamper shown in Figs. 14 and 16 to approximately the point 129, that this surplus concrete will be forced out and will drop through this opening giving a uniform unbroken tile.

When operating the machine we prefer to make the conveyer carrying the molds move about 3/8 of an inch for one rotation of the cams for operating the tamper, and the brackets 43 for imparting longitudinal movement to the tamper are arranged to give this movement in the direction of the movement of the conveyer when the tamper is down and to move the tamper at about the same speed as the conveyer. The concrete is mixed either by hand or by a suitable concrete mixer and placed within the hopper 19, and the remaining operations of filling the molds, tamping, forming, coloring, troweling to smooth the surfaces and cutting the tile are performed automatically, and so far as we are aware we are the first to construct a machine which will successfully do this.

The machine shown comprises a single conveyer, or in other words, is what we term a single machine. It will be obvious, however, that the frame may be widened to carry another conveyer with corresponding tile forming mechanism, so as to produce a double machine having twice the capacity. This is about as large a machine as may be properly handled by a single crew although it may be found later that even a larger number of conveyer units may be operated as a single machine.

We have found that, whereas a skilled workman working with the hand methods now generally employed to make this type of tile may make only from 200 to 250 tiles a day, with a single machine, as disclosed, we can easily make about 250 tile per hour, and secure a better and more uniform product.

Having thus set forth the nature of our invention, what we claim is:

1. In a tile making machine a plurality of molds placed end to end, means for advancing the molds, a hopper open at its lower end to discharge concrete onto the molds and provided with a movable gate at its rear end over the molds, means for imparting up and down and longitudinal movement to said gate to regulate the amount of concrete carried forwardly by the molds, and means rearwardly of the gate for shaping the upper surface of the concrete in the molds.

2. In a tile making machine, a plurality of molds placed end to end, means for advancing the molds, a hopper open at its lower end to discharge concrete onto the molds, an upright gate at the rear of said opening, the lower edge of said gate being shaped to correspond to substantially the transverse outline of the upper surface of the tile, means for imparting up and down and longitudinal movements to the lower edge of said gate to regulate the amount of concrete carried forwardly by the molds, and a tamper above the molds rearwardly of the gate for tamping the concrete in the molds.

3. In a tile making machine, a plurality of molds placed end to end, means for advancing the molds, a hopper open at its lower end to discharge concrete onto the molds, an upright gate at the rear of said opening, the lower edge of said gate being shaped to correspond to substantially the transverse outline of the upper surface of the tile, means for imparting up and down and longitudinal movements to the lower edge of said gate to regulate the amount of concrete carried forwardly by the molds, said gate operating means being arranged to move said lower edge in a direction contrary to the direction of movement of the molds when the gate is in its lowest position, and a tamper above the molds, rearwardly of the gate for tamping the concrete in the molds.

4. In a tile making machine a plurality of molds placed end to end, means for advancing the molds, an open bottomed hopper above the molds, a gate in the hopper above the molds to regulate the amount of concrete carried forwardly by the molds, the lower edge of the gate being shaped to correspond to substantially the outline of the upper surface of the tile, means for imparting up and down and longitudinal movements to the lower edge of said gate, a tamper to the rear of the gate shaped on its under side to give in general the desired form to the surface of the tile, and means for imparting up and down and longitudinal movements to said tamper.

5. In a tile forming machine an open bottomed hopper, a plurality of molds, means for advancing the molds under the hopper, a gate in said hopper over the molds to regulate the amount of concrete carried forwardly by the molds, a tamper to the rear of the gate shaped on its under side to give the desired form to the surface of the tile, means for imparting up and down movement to said tamper, and means for imparting a forward movement to the tamper when in its lower position at a speed substantially equal to that of the molds, said molds being provided with an upwardly extending flange along one longitudinal side edge to provide a concrete retaining means but being without such retaining means on the opposite longitudinal edge, and said tamper being provided with a downwardly extending tapered flange along its side edge over the latter edge of the molds to provide a concrete retaining means.

6. In a tile forming machine an open bottomed hopper, a plurality of molds, means for advancing the molds under the hopper, a gate in said hopper over the molds to regulate the amount of concrete carried forwardly by the molds, a tamper to the rear of the gate and provided on its underside with alternate longitudinal ridges and grooves with the sidewalls thereof inclined and the grooves deeper at the front end than at the rear end of the tamper, the tamper being also provided with an upwardly and forwardly inclined portion at the front end thereof, and means for imparting up and down and longitudinal movements to the tamper.

7. In a tile making machine a plurality of molds each having an upwardly extending concrete retaining flange along one side edge but without such retaining means along its opposite edge, means for advancing the molds, means for filling the molds with concrete, means for regulating the amount of concrete carried forward by the molds, a tamper to tamp the concrete in the molds having at its longitudinal edge over the latter edges of the molds a downwardly extending rib having its inner wall inclined upwardly and inwardly away from the edge, means for imparting up and down movements to the tamper, and means at the side of the tamper for removing surplus concrete.

8. In a tile making machine a plurality of molds, means for advancing the molds, means for filling the molds with concrete, means for regulating the amount of concrete carried forward by the molds, a tamper to tamp the concrete in the molds provided on its under side with alternate longitudinal ridges and grooves with the sidewalls thereof inclined with the grooves deeper at the front end than at the rear end of the tamper, the tamper being also provided with an upwardly and forwardly inclined portion at the front end thereof, and means for imparting up and down and longitudinal movements to said tamper.

9. In a tile forming machine a plurality of molds, means for advancing the molds, means for filling the molds with concrete as they are advanced, a tamper for tamping the concrete in the molds and shaping the upper surface thereof, a trowel bearing on the surface of the concrete to the rear of the tamper, and means for imparting intermittent blows to the trowel.

10. In a tile forming machine a plurality of molds, means for advancing the molds, means for filling the molds with concrete as they are advanced, a tamper for tamping the concrete in the molds and shaping the upper surface thereof, a trowel to the rear of the tamper shaped on its under side to conform to the shape of the upper surface of the concrete, and a hammer for imparting blows to the top of the trowel.

11. In a tile forming machine a plurality of molds, means for advancing the molds, means for filling the molds with concrete as they are advanced, a tamper for tamping the concrete in the molds and shaping the upper surface thereof, a trowel to the rear of the tamper shaped on its under side to conform to the shape of the upper surface of the concrete, adjustable screws for determining the position of the trowel above the molds, and means for hammering the top of the trowel.

12. In a tile forming machine a plurality of molds, means for advancing the molds, means for filling the molds with concrete as they are advanced, a tamper for tamping the concrete in the molds and shaping the upper surface thereof, a trowel to the rear of the tamper shaped on its under side to conform to the shape of the upper surface of the concrete, means for adjusting the inclination of the trowel, and means for continuously imparting blows to the top of the trowel.

13. In a tile forming machine a plurality of molds, means for advancing the molds, means for filling the molds with concrete as they are advanced, a tamper for tamping the concrete in the molds and shaping the upper surface thereof, a trowel bearing on the surface of the concrete to the rear of the tamper, means for hammering the top of the trowel, means for feeding coloring matter to the concrete, and a second trowel bearing on the surface of the concrete beyond the color supplying means.

14. In a tile forming machine a plurality of molds, means for advancing the molds, means for filling the molds with concrete as they are advanced, a tamper for tamping the concrete in the molds and shaping the upper surface thereof, means for supplying powdered coloring matter to the concrete comprising a hopper, means for controlling the discharge of coloring matter from the hopper, a sieve between the hopper and the concrete, and means for operating the sieve.

15. In a tile forming machine a plurality of molds, means for advancing the molds, means for filling the molds with concrete as they are advanced, a tamper for tamping the concrete in the molds and shaping the upper surface thereof, means for supplying powdered coloring matter to the concrete comprising a hopper, means for controlling the discharge of coloring matter from the hopper, a sieve between the hopper and the concrete, and means for imparting up and down and longitudinal movements to said sieve.

16. In a tile forming machine a plurality of molds, means for advancing the molds, means for filling the molds with concrete as they are advanced, a tamper for tamping the concrete in the molds and shaping the upper surface thereof, means for supplying powered coloring matter to the concrete comprising a hopper having a slot in the bottom thereof, a tapered gate extending through said slot, a shaft, means for supporting the gate from the shaft, and means for rocking the shaft to raise and lower the gate.

17. In a tile forming machine a plurality of molds, means for advancing the molds, means for filling the molds with concrete as they are advanced, a tamper for tamping the concrete in the molds and shaping the upper surface thereof, means for supplying powdered coloring matter to the concrete comprising a hopper having a slot in the bottom thereof, a tapered gate extending through said slot, a shaft, means for supporting the gate from the shaft, means for rocking the shaft to raise and lower the gate, and means for varying the amount of rocking movement imparted to the shaft.

18. In a title forming machine a plurality of molds, means for advancing the molds, means for filling the molds with concrete as they are advanced, a tamper for tamping the concrete in the molds and shaping the upper surface thereof, a trowel bearing on the surface of the concrete to the rear of the tamper, means for imparting blows to the top of the trowel, means for supplying powdered coloring matter to the surface of the concrete, a second trowel bearing on the surface of the concrete beyond the color supplying means, and means for imparting blows to the top of the latter trowel.

19. In a tile forming machine a plurality of molds, means for advancing the molds, means for filling the molds with concrete as they are advanced, a tamper for tamping the concrete in the molds and shaping the upper surface thereof, a trowel bearing on the surface of the concrete to the rear of the tamper, means for imparting blows to the top of the trowel, means for supplying powdered coloring matter to the surface of the concrete, a second trowel bearing on the surface of the concrete beyond the color supplying means, means for imparting blows to the top of the latter trowel, and one or more similar stationary trowels beyond the latter trowel and bearing on the surface of the concrete.

20. In a tile forming machine, a plurality of molds, means for advancing the molds, means for filling the molds with concrete as they are advanced, a tamper for tamping the concrete in the molds and shaping the upper surface thereof, a trowel to the rear of the tamper shaped on its under side to conform to the shape of the upper surface of the concrete, said trowel being mounted so that it is free to move upwardly away from the concrete, and means for tapping the top of the trowel.

21. In a tile forming machine, a plurality of molds, means for advancing the molds, means for filling the molds with concrete as they are advanced, a tamper for tamping the concrete in the molds and shaping the upper surface thereof, a trowel to the rear of the tamper shaped on its under side to conform to the shape of the upper surface of the concrete, said trowel being mounted so that it is free to move upwardly away from the concrete, means for tapping the top of the trowel, means to the rear of the trowel for applying coloring matter to the top of the concrete, a second trowel to the rear of the color applying means substantially the same as the first trowel and mounted so that it is free to move upwardly away from the surface of the concrete and means for tapping the top of the latter trowel.

22. The method of making concrete tile which consists in advancing a support, placing a layer of concrete on the support, tamping and shaping the upper surface of the concrete as it is being advanced, troweling the surface and tapping or hammering the trowel while troweling.

23. The method of making concrete tile which consists in advancing a support, placing a layer of concrete on the support, tamping and shaping the upper surface of the concrete as it is being advanced, troweling the surface, tapping or hammering the trowel during the troweling operation and cutting the layer of concrete to the desired lengths.

24. The method of making concrete tile which consists in advancing a support consisting of a plurality of removable sections, forming a continuous slab of concrete on the support, tamping and shaping the surface of the concrete, troweling the shaped surface and tapping or hammering the trowel during the troweling operation, cutting the shaped slab to lengths, and removing the sections and setting them aside to allow the length of concrete carried thereby to harden.

25. The method of making concrete tile which consists in advancing a support, placing a layer of concrete on the support, tamping and shaping the upper surface of the concrete as it is being advanced, placing coloring matter on the surface of the concrete, then troweling the surface as the concrete is being advanced, and tapping the trowel to force it against the concrete during the troweling operation.

26. The method of making concrete tile which consists in advancing a support, placing a layer of concrete on the support, tamping and shaping the upper surface of the concrete as it is being advanced, troweling the surface after the tamping operation, tapping the top of the trowel during the troweling operation, applying powdered coloring matter to the upper surface of the concrete, troweling the said surface as it is being advanced after the coloring operation, and tapping the top of the latter trowel during the troweling operation.

In testimony whereof we affix our signatures.

JOHN N. SCHWARZ.
VINCENT W. SCHWARZ.